Dec. 13, 1966     S. ZAROMB     3,291,551
LIGHT MODULATING APPARATUS AND METHOD
Filed Feb. 12, 1963
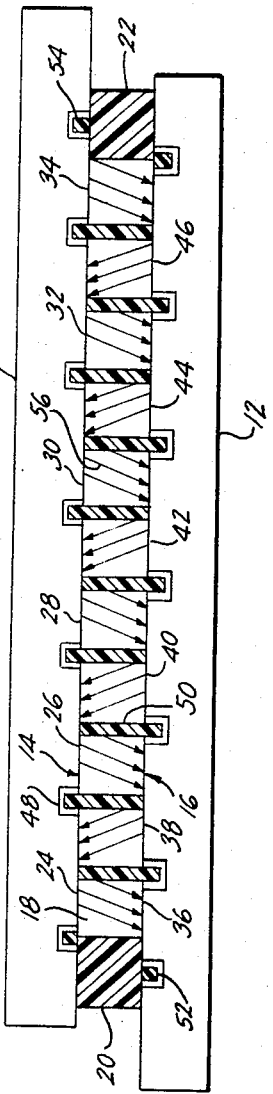
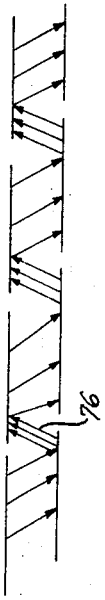
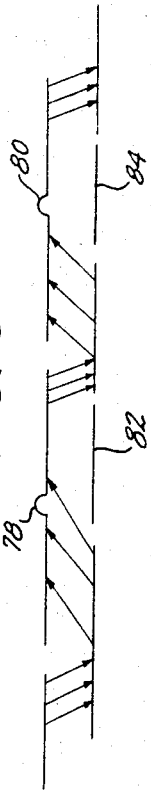
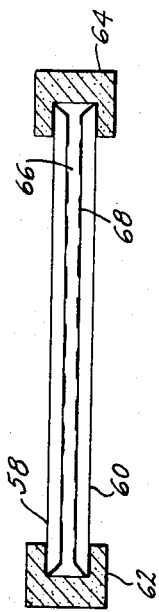
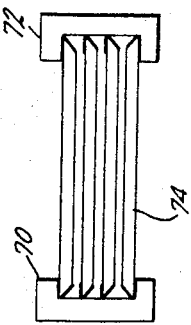
INVENTOR.
SOLOMON ZAROMB
BY
*Alan K. Roberts*
ATTORNEY

United States Patent Office 3,291,551
Patented Dec. 13, 1966

3,291,551
LIGHT MODULATING APPARATUS
AND METHOD
Solomon Zaromb, 56–03 Hilltop Ave., Baltimore, Md.
Filed Feb. 12, 1963, Ser. No. 257,988
16 Claims. (Cl. 350—160)

This invention relates to light modulating apparatus and to related methods.

It is an object of the invention to embody electroplating techniques in an improved light modulating apparatus in such a manner as to provide an improved light modulating technique.

It is a further object of the invention to provide improved light modulating devices and techniques susceptible of use as light shutters, reflectors, information memories, and the like.

In accordance with the invention there is contemplated a light modulator comprising at least one cell including spaced elements of light-permeable electrically insulated material having facing surfaces upon which are positioned parallel strips of light-permeable electrically-conductive material upon which is electrochemically deposited a substance adapted for rendering the strips opaque for light interception or reflection purposes.

According to the invention, an electric current is passed through an electrolyte and the aforesaid strips, the current being passed through the strips in series to effect electro-chemical reaction.

Some preferred embodiments of the invention will next be explained with reference to the accompanying drawing in which:

FIGURE 1 is a side, partially sectional and diagrammatical, view of one preferred embodiment of the invention;

FIGURE 2 illustrates a second embodiment of the invention in diagrammatic form;

FIGURE 3 illustrates still another embodiment of the invention in diagrammatic form;

FIGURE 4 diagrammatically illustrates yet another embodiment of the invention; and FIGURE 5 diagramatically illustrates a further embodiment of the invention.

The invention contemplates the use of the principles of reversible electroplating for purposes of light modulation and in accordance with which thin films of electrically-conductive material on a light-permeable body are alternatively plated and deplated for purposes of being rendered light-permeable and opaque.

It is known that materials such as tin oxide can be coated on to a light-permeable body such as glass, quartz, and the like, in such thicknesses as to permit the passage of light while being capable of undergoing repeated plating-deplating cycles without exhibiting signs of deterioration.

It is also known that various electrolytes such as concentrated NaI-AgI solutions are capable of electrochemically depositing on elements of the aforesaid materials to render the same opaque or light-permeable according to the electrical signals applied thereto.

The apparatus illustrated in FIG. 1 is one embodiment of the invention utilizing the above principles. This apparatus comprises two light-permeable, electrically non-conductive plates 10 and 12 made, for example, of glass or fused quartz. Plates 10 and 12 have facing surfaces 14 and 16 defining a space therebetween, this space being confined to form a chamber 18 by means of insulated gaskets 20 and 22 positioned between said plates. An electrolyte of the aforesaid type is positioned in the chamber 18 and a plurality of spaced parallel strips 24, 26, 28, 30, 32 and 34 are positioned on surface 14 whereas a plurality of spaced parallel strips 36, 38, 40, 42, 44 and 46 are positioned on surface 16. The strips are of an electrically-conductive material thin enough to be light-permeable as has been indicated above.

Between the strips on each surface are positioned grooves 48. Extending from the surface facing each groove is a barrier element 50 which extends completely across the chamber 18 and into the opposed groove.

Contacts 52 and 54 are provided by means of which a voltage is applied to the strips which are most remote from one another.

The use of barriers 50 provides that the most convenient paths for current to follow are approximately zig-zag as indicated by the arrowed lines 56 in the chamber 18.

The apparatus described above minimizes the number of electrical contacts necessary to apply a voltage across a reversibly plateable conductive surface or the like. The apparatus furthermore permits attaining superior speeds of plating to those heretofore achieved.

Assuming current is passed from the right to the left in FIG. 1, plating occurs alternately at the bottom and top of adjacent strips. A series flow of current is thus assured thereby minimizing the number of electrical contacts necessary, as indicated above.

Besides facilitating manufacture, this approach is found to eliminate incandescence and arcing encountered in other arrangements. Moreover, since the required plating charge is proportional to areas of one strip, the required plating charge, total current, capacitance, required condenser size and time constant of the circuit are all appreciably reduced. Power supply requirements are minimized and plating time can be reduced to substantially less than 100 microseconds and even to less than 50 microseconds.

The arrangement illustrated in FIG. 1 affords a superior uniformity of plating since the same current must pass through each of the series of strips. Better deplating is also assured. The series arranged strips are also less subject to damage by excessive currents than strips connected in parallel which become overloaded along restricted paths of least resistance.

The strips illustrated in FIG. 1 may be rectilinear and may also be curved or concentric.

In another preferred embodiment of the invention it is possible to eliminate the barrier elements by reducing the spacing between the plates to, for example, 1,000th of an inch or less. The grooves may be replaced by fine, shallow, non-conducting lines or breaks in the conductive film.

Such an embodiment of the invention is illustrated in FIG. 2 wherein are employed optically polished fused quartz plates 58 and 60, these plates being possibly of any other high melting material having a low coefficient of thermal expansion upon which a transparent conductive oxide may be formed or sprayed at a high temperature without warping or otherwise distorting the flat polished surfaces.

To avoid undesirable spurious resistance between the end contacts and extreme strips the end contacts 62 and 64 may consist of carbon or heavily coated conductive quartz or metallized glass exposed directly to the electrolyte in the chamber 66.

In FIG. 2 can be seen a plurality of oxide strips 68 arranged as in the arrangement of FIG. 1, but with the absence of the barrier elements, the close spacing of the facing strips making the barrier elements unnecessary. This close spacing, as well as the conductive end contacts directly exposed to the electrolyte, markedly reduce the overall cell resistance.

FIG. 3 illustrates a further embodiment of the invention employing end contacts and supports 70 and 72 with a plurality of plates 74 in back-to-back relationship thus providing a plurality of cells (such as in FIGS. 1 and 2), the strips being positioned on both sides of the inner of the plates. Such an arrangement permits high speed operation. Such an arrangement permits maximum opacity changes in minimum periods of time.

The electrodeposited layers in the above-described embodiments may be light-reflective from the side adjacent the transparent electrodes and opaque from the side facing the electrolyte. If it is desired to make only one of the plates reflective over most of its surface then the alternating strips can be made of different widths by displacing the electrodes relative to one another in a direction perpendicular to the breaks between the strips.

Such an embodiment of the invention is illustrated in FIG. 4 wherein it is seen that the strips are asymmetrically staggered rather than symmetrically staggered as in the aforesaid embodiments of the invention. This will be apparent in FIG. 4 by the closer spacing of arrows 76 as contrasted to that of the arrows which are spaced according to the degree of overlap of the facing strip.

If it is desired to have certain segments of strips remain transparent, it is possible in accordance with the invention to provide short circuits between adjacent strips. FIG. 5 illustrates an embodiment of this nature wherein are provided shorting elements 78 and 80, strips 82 and 84 remaining clear since no current is passed through the same.

These shorting elements may consist of photoconductors, movable conducting fibers or other current switching means situated between the conductive strips. If photoconductors are used, such as films of cadmium sulfide or lead sulfide in the presence of ammoniated nickel or manganese plating solutions, switches 78 and 80 become conducting when illuminated from their side of the cell. Then, once the segments 82 and 84 are cleared, light passing through the opposite sides of the cell can maintain the switces 78 and 80 in a conducting state.

The elements described above can be used in a wide variety of optical systems and, additionally, to constitute memory devices for data processors, as well as display boards or decorative patterns.

It should be noted that adjacent strips may be broken into a large number of smaller squares or rectangles suitable for the use planned for the above described cells. The breaks provided by the conductive strips may form quadrilled, diamond shaped or other cross-hatched patterns.

Most of the foregoing description is applicable to electrochemical light modulators based not only on reversible electroplating but also on electrically controlled reversible oxidation and reduction of electrolyte components of variable colors.

What is claimed is:

1. A light modulator comprising at least one cell including: spaced elements of transparent material or relatively low electrical conductivity having facing surfaces defining a space therebetween, means operatively associated with said elements to confine said space to form a chamber, electrical contacts extending into said chamber, said contacts being separated by spaced strips of light-permeable electrically conductive material on each said surface, the strips on one surface being at least approximately parallel but staggered in an approximately overlapping relationship relative to the strips on the other surface, and an electrolyte in said chamber, said strips being so related in said chamber that current will flow through said electrolyte between said staggered strips along approximately zig-zag paths so as to form light-absorbing layers at the surfaces of said strips upon application of an electrical potential between said electrical contacts.

2. A modulator as claimed in claim 1 wherein at least one of said electrical contacts is made of heavily conductive oxide-coated material.

3. A modulator as claimed in claim 1 wherein said strips are at least approximately rectilinear.

4. A modulator as claimed in claim 1 wherein said strips are curved.

5. A modulator as claimed in claim 1 wherein said strips are of at least approximately equal width.

6. A modulator as claimed in claim 1 comprising means for electrically connecting selected adjacent strips.

7. A modulator as claimed in claim 1 wherein said elements are of fused quartz or other high-melting transparent material having a low coefficient of thermal expansion.

8. A modulator as claimed in claim 1 wherein said conductive strips are separated by narrow strips having a relatively low electrical conductivity.

9. A modulator as claimed in claim 1 wherein said elements are provided with grooves separating the strips and comprising barriers on each element extending into the grooves in the other elements.

10. A modulator as claimed in claim 1 wherein the strips are of metal oxide.

11. A modulator as claimed in claim 1 wherein at least three strips are located between said electrical contacts.

12. A modulator as claimed in claim 6 wherein the electrically connecting means is photoconductive.

13. A modulator as claimed in claim 1 wherein the electrolyte solution directly adjacent any one of the electrical contacts acts as an electrical connector between said contacts and the nearest conductive strips.

14. A modulator as claimed in claim 1 wherein said electrical contacts are situated near the outermost of said strips.

15. A modulator as claimed in claim 1 wherein at least one of said electrical contacts is made of carbon.

16. A modulator as claimed in claim 1 wherein two or more of said cells are in back-to-back relationship for high-speed operation.

References Cited by the Examiner
UNITED STATES PATENTS

| | | | |
|---|---|---|---|
| 2,301,743 | 11/1942 | Nagy et al. | 88—61 X |
| 3,153,113 | 10/1964 | Flanagan et al. | 88—61 |
| 3,190,177 | 6/1965 | Kaprelian | 88—61 |

JEWELL H. PEDERSEN, *Primary Examiner.*

RONALD L. WIBERT, JEWELL H. PEDERSEN,
*Examiners.*

E. S. BAUER, *Assistant Examiner.*